(12) United States Patent
Turner

(10) Patent No.: US 6,336,684 B1
(45) Date of Patent: Jan. 8, 2002

(54) CONTROL SYSTEM FOR OVERBURDEN DISCHARGE

(75) Inventor: Marcel A. Turner, Moranbah (AU)

(73) Assignee: BHP Coal Pty. Ltd., Queensland (AU)

( * ) Notice: Subject to any disclaimer, the term of this patent is extended or adjusted under 35 U.S.C. 154(b) by 0 days.

(21) Appl. No.: 09/485,489

(22) PCT Filed: Aug. 12, 1998

(86) PCT No.: PCT/AU98/00638

§ 371 Date: Jun. 5, 2000

§ 102(e) Date: Jun. 5, 2000

(87) PCT Pub. No.: WO99/08947

PCT Pub. Date: Feb. 25, 1999

(30) Foreign Application Priority Data

Aug. 12, 1997 (AU) ............................................. PO 8535

(51) Int. Cl.[7] ........................... B65G 43/00; E21C 35/00
(52) U.S. Cl. ............................. 299/1.9; 37/93; 198/301
(58) Field of Search .......................... 37/93, 190, 463; 299/1.9, 18, 64; 198/301, 571, 594, 507

(56) References Cited

U.S. PATENT DOCUMENTS 3,285,385 A * 11/1966 Langner ..................... 198/301
3,939,958 A * 2/1976 Pyles .......................... 198/301
4,054,213 A * 10/1977 Chever .................... 198/301 X
4,206,840 A * 6/1980 Hanson ....................... 198/301

OTHER PUBLICATIONS

"Reactive/Adaptive Fuzzy Control System for a Mobile Mining Robot" Chris W. Barfoot and M. Youset Ibrahim.

Ibrahim, M. Yousef and Barfoot, C., "Robotization of Coal Harvesting in Open Cut Lignite Mines", Industrial Robot, vol. 24, No. 5, pp. 376–381, Sep. 1997.

* cited by examiner

Primary Examiner—David Bagnell
Assistant Examiner—Sunil Singh
(74) Attorney, Agent, or Firm—Miles & Stockbridge P.C.; John C. Kerins

(57) ABSTRACT

An overburden removal system is provided which includes a bucketwheel (3) which cuts overburden from a wall (5) of the mine and discharges the overburden via a discharge boom (7) onto a hopper car (11) which travels on rails (9). The hopper car (11) delivers the overburden onto a conveyor belt (13). The system is characterized by a sensor (17) mounted on the hopper car (11) to detect the lateral position of the conveyor belt (13) relative to the hopper car (11) and a control device responsive to the extent of lateral drift for controlling the position of delivery of overburden into the hopper car.

17 Claims, 2 Drawing Sheets

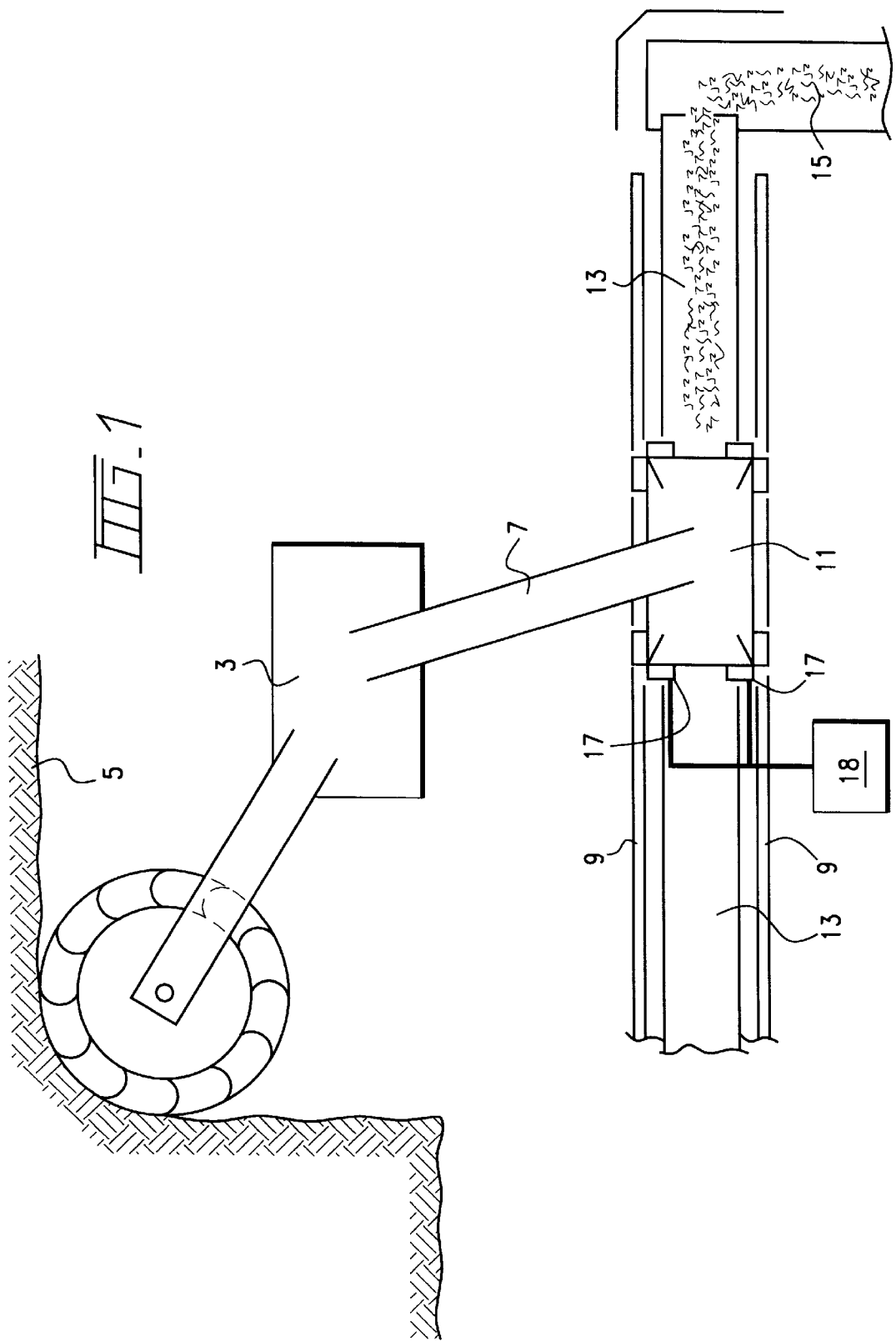

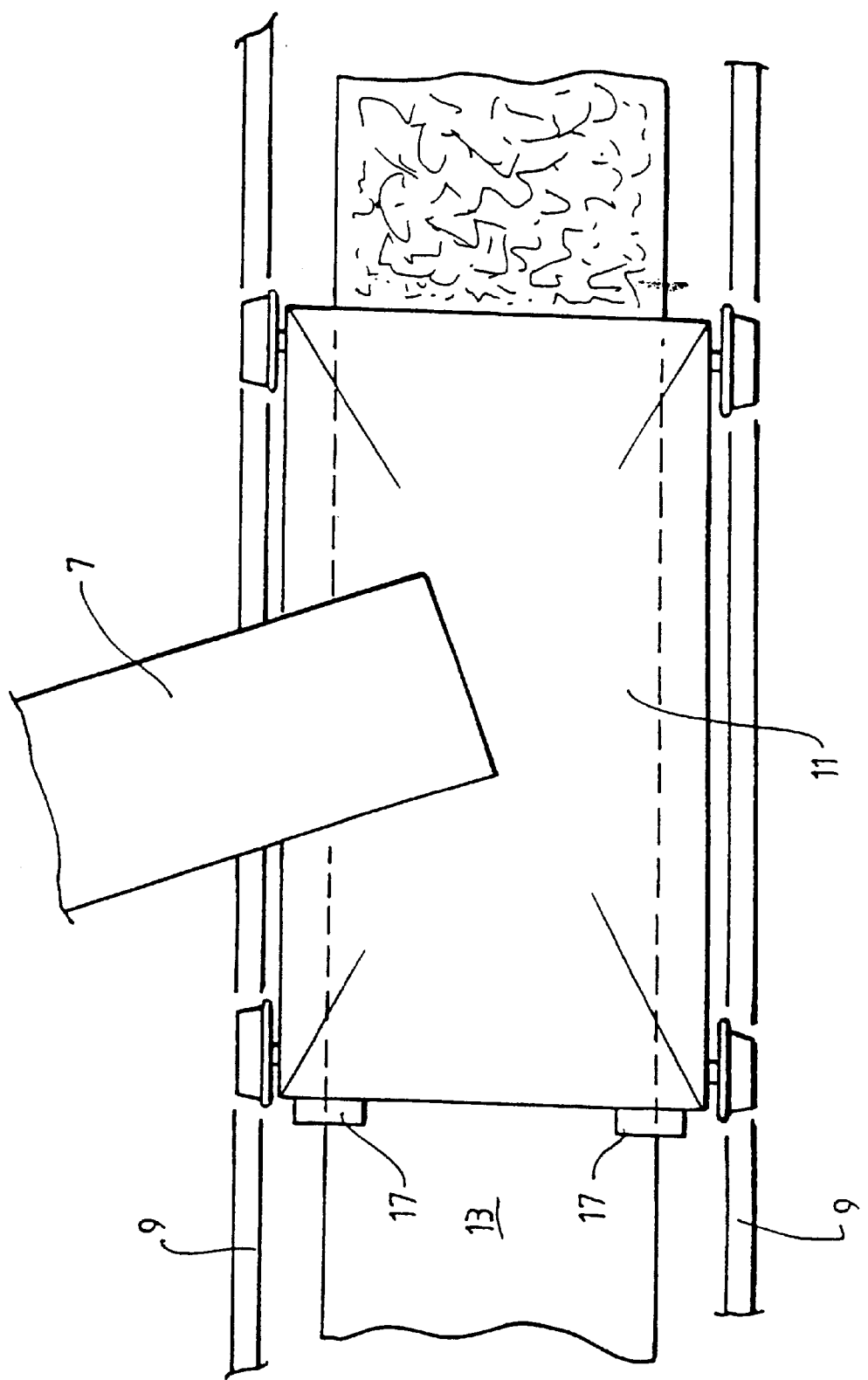

CONTROL SYSTEM FOR OVERBURDEN DISCHARGE

BACKGROUND OF THE INVENTION

1. Field of the Invention

The present invention relates to open cut mining.

The present invention relates particularly to a system for controlling the discharge of a mined material from a mining means onto a transfer conveyor belt.

The present invention relates more particularly, although by no means exclusively, to a system for controlling the discharge of overburden from a discharge boom of a bucketwheel mining means onto a transfer conveyor belt via a hopper car.

2. Description of Related Art

In open cut mining it is known to use a bucketwheel or other large scale mining means located on a mine floor to remove overburden from the face of a wall of the mine.

The bucketwheel in mounted on tracks that, enable it to move along the length of a mine wall and to cut into the wall. Typically, the length or the mine wall is 2.4 km, the wall height up to 25 m, and the cut into the wall made by the bucketwheel is 40–45 m.

When the bucketwheel reaches the end of the length of the wall, typically, the bucketwheel is returned to the other and and the process of cutting into and moving along the length of the wall is repeated.

The overburden removed by the bucketwheel in transferred via a discharge boom of the bucketwheel into a hopper car and via the hopper car onto a transfer conveyor belt that runs parallel to and spaced from the wall. Typically, the conveyor belt is 70 m from the cut wall. The overburden is transported by the conveyor belt and by connecting belts to stockpiles.

The hopper car straddles the conveyor belt and travels on rails on each aide of the belt. The hopper car includes a hopper defined by front, rear, and side walls, a base which include a chute for transferring overburden onto the conveyor belt, and a mechanical roller assembly inside the chute which prevents direct impact on the conveyor belt of overburden falling down from the discharge boom and assists in breaking up larger rocks in the overburden.

The hopper car interrupts the flow of overburden from the discharge boom onto the conveyor belt end thereby minimizes the impact of the overburden falling onto the belt and the damage to the belt caused by the impact.

It is important to control the delivery of overburden onto the conveyor belt so that the conveyor belt tracks correctly and there is minimal loss of overburden from the belt.

One significant problem arising from the loss of overburden, particularly rocks, from the conveyor belt is that the overburden can actuate safety pull ropes that run along full lengths of the conveyor belt on both sides of the conveyor belt for safety purposes.

The actuation of a safety pull rope causes a system trip which shuts down all conveyor belts, causes excessive wear on the conveyor brakes, and excessive motor stress and load when restarting conveyor belts which are loaded with overburden.

On average, lost time caused by overburden-actuated safety pull ropes amounts to approximately one hour per shift. It can readily be appreciated that this is a significant amount of lost time.

Lateral drift of the conveyor belt relative to the hopper car is one factor that is relevant to the loss of overburden from the conveyor belt. Lateral drift can be as much as 600 mm for a belt width of 1800 mm. Lateral drift is caused by a series of factors including, by way of example:

(i) factors associated with delivery of overburden and more particularly distribution of overburden onto the conveyor belt; and (ii) factors associated with the conveyor belt modules and stringers.

With regard to item (ii) the conveyor belt is continuous and is supported over its length by a series of support modules arranged end to end. If the modules are out of alignment—which can occur without difficulty in a practical mining operation—this can cause lateral drift of the belt with respect to the hopper car.

An object of the present invention is to provide a system for controlling discharge of overburden from a discharge boom of a bucketwheel onto a conveyor belt via a hopper car which minimises the problem of overburden-actuated safety pull ropes described above.

BRIEF SUMMARY OF THE INVENTION

According to the present invention there is provided a system for controlling discharge of a mined material from a mining means onto a transfer conveyor belt via a hopper car which straddles the conveyor belt and travels along the length of the conveyor belt and has an outlet for discharging the mined material onto the conveyor belt, which system comprises:

(i) a sensor means for sensing the extent of lateral drift of the conveyor belt relative to the hopper car; and (ii) a control means responsive to the extent of lateral drift of the conveyor belt relative to the hopper car as determined by the sensor means for controlling the position of delivery into the hopper car of mined material from the mining means to produce discharge of the mined material from the hopper car onto the conveyor belt with minimal loss of the mined material from the conveyor belt and/or to reduce the lateral drift of the conveyor belt relative to the hopper car.

It is preferred that the mined material be overburden.

It is preferred that the mining means comprise a discharge boom having a discharge end for discharging the mined material into the hopper car.

It is preferred particularly that the mining means be a bucketwheel.

It is preferred that the sensor means be adapted to detect metal in or associated with the conveyor belt.

It is preferred that the conveyor belt comprise metal.

It is preferred particularly that the conveyor belt be made from a wire-reinforced elastomeric material.

Alternatively, it is preferred that the conveyor belt be made from a non-metallic material and comprise a metallic marker mean on the belt.

It is preferred that the sensor means comprise an array of spaced-apart metal detectors which are positioned to extend laterally to the direction of movement of the conveyor belt above or below the conveyor belt so that, in use, the position of a side of the conveyor belt is determined to be between two adjacent metal detectors when one of the detectors detects metal and the other detector does not detect metal.

It is preferred particularly that the array of metal detectors be mounted on the hopper car.

It in preferred more particularly that the array of metal detectors be mounted on the hopper car at a forward end of the hopper car above or below the entry of the conveyor belt beneath the hopper car.

It is preferred that the control means be adapted to adjust automatically any one or more of:
(i) the forward and backwards movement of the hopper car relative to the mining means;
(ii) the height of the discharge outlets of the discharge boom above the hopper car; and
(iii) the slew of the discharge boom relative to the hopper car;
in response to the lateral drift of the conveyor belt relative to the hopper car as sensed by the sensor means.

BRIEF DESCRIPTION OF THE DRAWINGS

The present invention in described further by way of example with reference to the accompanying drawings, of which:

FIG. 1. in a schematic top plan view of an overburden removal system; and

FIG. 2 is a detailed view of the hopper car shown in FIG. 1.

FIG. 1 illustrates schematically an overview of a typical overburden removal system in an open-cut mine.

DETAILED DESCRIPTION OF THE PREFERRED EMBODIMENTS

The overburden removal system includes a bucketwheel 3 which cuts overburden from a wall 5 of the mine and discharges the overburden via a discharge boom 7 of the bucketwheel 3 onto a hopper car 11 which travels on rails 9.

In turn, the hopper car 11 delivers the overburden via a chute (not shown) in the base of the hopper car 11 onto a transfer conveyor belt 13.

The transfer conveyor belt 13 forms part of a network of conveyor belts, which includes conveyor belt 15, which transport the overburden to a stockpile (not shown).

The basic construction of the bucketwheel 3 (including the discharge boom 7), the hopper car 11, and the conveyor belt 13 are conventional.

In accordance with a preferred embodiment of the present invention, a sensor means 17 is mounted on the forward end of the hopper car 11 to detect the lateral position of the conveyor belt 13 relative to the hopper car 11.

The conveyor belt 13 is made from a wire reinforced elastomeric material. The sensor means 17 comprises two separate arrays of inductive tracking devices (not shown) for detecting metal in the conveyor belt 13.

Each array comprises a plurality of tracking devices which are spaced apart and extend laterally to the direction of movement of the conveyor belt 13. The arrays are positioned to detect the sides of the conveyor belt 13. Specifically, the arrays are positioned above or below the the conveyor belt 13 in the region of the sides of the conveyor belt 13. The tracking devices are appropriately shielded to minimise interference from metal other than metal in or on the conveyor belt 13.

It can readily be appreciated that in use of the sensor means 17 the position of the sides of the conveyor belt 13 relative to the hopper car 11 (and therefore the lateral drift of the conveyor belt 13 relative to the hopper car 11) is determined to be between adjacent tracking devices in each array when one of the tracking devices detects metal and the adjacent tracking device does not detect metal.

The above-described sensor means 17 forms part of a preferred embodiment of a system for controlling discharge of overburden onto the conveyor belt 13 in accordance with the present invention.

The system further comprises a control means 18 which is responsive to the lateral drift of the conveyor belt 13 relative to the hopper car 11 as determined by the sensor mans 17 to control the position of discharge of overburden from the discharge boom 7 into the hopper car 11. The control means is designed to take into account the lateral drift of the conveyor belt 13 (and other relevant factors) in determining the optimum distribution of overburden in the hopper car 11 to produce discharge of overburden from the hopper car 11 onto the conveyor belt 13:
(i) with minimal loss of overburden from the conveyor belt 13; and/or
(ii) to rove the belt 13 to reduce the lateral drift.

The control means is adapted to adjust automatically any one or more of the following parameters to achieve the optimum distribution:
(i) the forward and backwards movement of the hopper car 11 relative to the bucketwheel 3;
(ii) the height of the discharge boom 7 above the hopper car 11; and
(iii) the slew of the discharge boom 7 relative to the hopper car 11.

The control means is also designed to move the hopper car 11 automatically with the bucketwheel 3. In this regard, the relative position of the bucketwheel 3 and the hopper car 11 is determined by an assembly of a deflector shield (not shown) welded to the end of the discharge boom 7 and an ultrasonic pulse generator/sensor (not shown) mounted on the hopper car 11 which transmits ultrasonic pulses towards the deflector shield and detects ultrasonic pulses reflected from the shield. At any point in time, the radial distance of the contact location of an ultrasonic pulse with the shield from a centrepoint on the shield is an indication of the relative position of the bucketwheel 3 and the hopper car 11. The control means responds to the relative position to actuate drive of the hopper car 11 as required to track the hopper car 11 with the bucketwheel 3.

The above-described preferred embodiment of the discharge control system of the present invention is an effective and reliable means of controlling discharge of overburden onto the conveyor belt 11 to minimize overburden actuated safety pull rope tripping of the overburden removal system.

Many modifications may be made to the preferred embodiment of the present invention described above without departing from the spirit and scope of the present invention.

For example, whilst the sensor means of the preferred embodiment comprises inductive tracking devices, it can readily be appreciated that the present invention is not so limited and extends to any suitable sensor means.

Furthermore, whilst the preferred embodiment is described in the context of discharging overburden, it can readily be appreciated that the invention in not so limited and extends to discharging any mined material.

What is claimed is:

1. A system for controlling discharge of a mined material from a mining means onto a conveyer belt via a hopper car which straddles the conveyor belt and travels along the length of the conveyor belt and has an outlet for discharging mined material onto the conveyor belt, which system comprises:
(i) a sensor means for sensing the extent of lateral drift of the conveyor belt relative to a hopper car; and
(ii) a control means responsive to the extent of lateral drift of the conveyor belt relative to the hopper car as determined by the sensor means for controlling the position of delivery into the hopper car of mined material from the mining means to produce discharge of the mined material from the hopper car onto the conveyor belt with minimal loss of the mined material from the conveyor belt and/or to reduce the lateral drift of the conveyor belt relative to the hopper car.

2. The system defined in claim 1 wherein the mining means comprises a discharge boom having a discharge end for discharging the mined material into the hopper car.

3. The system defined in claim 2, wherein the mining means is a bucketwheel.

4. The system defined in claim 2, wherein the sensor means is adapted to detect metal in or associated with the conveyor belt.

5. The system defined in claim 1 wherein the mining means is a bucketwheel.

6. The system defined in claim 5 wherein the sensor means is adapted to detect metal in or associated with the conveyor belt.

7. The system defined in claim 6 wherein the conveyor belt comprises metal.

8. The system defined in claim 7 wherein the conveyor belt is made from a wire-reinforced elastomeric material.

9. The system defined in claim 8, wherein the sensor means comprise an array of spaced-apart metal detectors which are positioned to extend laterally to the direction of movement of the conveyor belt above or below the conveyor belt so that, in use, the position of a side of the conveyor belt is determined to be between two adjacent metal detectors when one of the detectors detects metal and the other detector does not detect metal.

10. The system as defined in claim 7 wherein the conveyor belt is made from a non-metallic material and comprises a metallic marker means on the belt.

11. The system defined in claim 10 wherein the sensor means comprise an array of spaced-apart metal detectors which are positioned to extend laterally to the direction of movement of the conveyor belt above or below the conveyor belt so that, in use, the position of a side of the conveyor belt is determined to be between two adjacent metal detectors when one of the detectors detects metal and the other detector does not detect metal.

12. The system defined in claim 11 wherein the array of metal detectors is mounted on the hopper car.

13. The system in claim 12 wherein the array of metal detectors is mounted on the hopper car at a forward end of the hopper car above or below the entry of the conveyor belt beneath the hopper car.

14. The system defined in claim 7, wherein the sensor means comprise an array of spaced-apart metal detectors which are positioned to extend laterally to the direction of movement of the conveyor belt above or below the conveyor belt so that, in use, the position of a side of the conveyor belt is determined to be between two adjacent metal detectors when one of the detectors detects metal and the other detector does not detect metal.

15. The system defined in claim 6 wherein the sensor means comprise an array of spaced-apart metal detectors which are positioned to extend laterally to the direction of movement of the conveyor belt above or below the conveyor belt so that, in use, the position of a side of the conveyor belt is determined to be between two adjacent metal detectors when one of the detectors detects metal and the other detector does not detect metal.

16. The system as defined in claim 1 wherein the control means is adapted to adjust automatically any one or more of:
   (i) the forward and backward movement of the hopper car relative to the mining means;
   (ii) the height of the discharge outlets of the discharge boom above the hopper car; and
   (iii) the slew of the discharge boom relative to the hopper car;

in response to the lateral drift of the conveyor belt relative to the hopper car as sensed by the sensor means.

17. The system as defined in claim 1, wherein the sensor means is adapted to detect metal in or associated with the conveyor belt.

* * * * *